United States Patent [19]

Fustier et al.

[11] Patent Number: 4,529,606

[45] Date of Patent: Jul. 16, 1985

[54] CITRUS FLAVORED BEVERAGE IN POLYETHYLENE CONTAINERS

[75] Inventors: Patrick Fustier; Ronald R. Dale, both of Cobourg, Canada

[73] Assignee: General Foods Inc., Ontario, Canada

[21] Appl. No.: 642,600

[22] Filed: Aug. 20, 1984

[51] Int. Cl.³ ............................ A23L 2/00; A23L 2/02
[52] U.S. Cl. ................................ 426/330.3; 426/330.5; 426/590; 426/599; 426/106; 426/397
[58] Field of Search ............... 426/590, 602, 599, 106, 426/330.5, 330.3

[56] References Cited

U.S. PATENT DOCUMENTS

| | | | |
|---|---|---|---|
| 3,658,552 | 4/1972 | Carlson et al. | 426/590 X |
| 4,093,750 | 6/1978 | Babayan | 426/590 X |
| 4,163,807 | 8/1979 | Jackman | 426/599 |
| 4,279,940 | 7/1981 | Wurzburg et al. | 426/599 X |
| 4,349,577 | 9/1982 | Tessler | 426/590 |
| 4,388,330 | 6/1983 | Wobben et al. | 426/599 X |
| 4,479,971 | 10/1984 | Eng et al. | 426/330 |

Primary Examiner—Robert Yoncoskie
Attorney, Agent, or Firm—Linn I. Grim; Thomas R. Savoie; Daniel J. Donovan

[57] ABSTRACT

The invention describes the improvement in a citrus flavored ready-to-drink beverage contained in a polyethylene container by adding small amounts of coconut oil or dearomatized cocoa butter to said beverage to reduce flavor loss, minimize off-flavor development and extending the shelf life of said beverage.

12 Claims, No Drawings

CITRUS FLAVORED BEVERAGE IN POLYETHYLENE CONTAINERS

BACKGROUND OF THE INVENTION

1. Field of the Invention

The invention relates to a method for improving a citrus flavored ready-to-drink beverage contained in a polyethylene container by adding specific clouding agents whereby over a period of time there is a reduction of flavor loss, minimization of off-flavor development and extension of shelf life. The clouding agents used are coconut oil and dearomatized cocoa butter, generally in the form of emulsions.

2. Description of The Prior Art

An increase in popularity has been observed for ready-to-drink beverages because of their sale in convenience aseptic packaging known as Tetra Pak ®, Tetra Briks ®, Combi Bloc ®, International Paper (IP) containers and the like. These packages generally include an outer cover of cardboard, hard paper, hard plastic and the like. Inside these packages is an inner liner of a flexible material in which the beverage is sealed. The preferred liner for these packages are polyethylene especially low density polyethylene, because of its low cost, availability, convenience of packaging the beverage and its durability. As outstanding as polyethylene is as a packaging container for beverages, a difficulty arises in that the polyethylene readily absorbs d-limonene, the main constituent of citrus flavor oils. The loss of d-limonene detrimentally affects the sensory quality of ready-to-drink citrus beverages immediately on filling and subsequently on standing. The significant loss of d-limonene reduces the highly desired citrus flavors of the drink. Polyethylene is also known to absorb other highly desirable terpenes and sesquiterpenes which are flavor volatiles as well as some key aldehyde constituents. The reduction of these components and others can reduce the desired organoleptic quality of the beverage. As convenient as polyethylene is as a container for citrus flavored ready-to-drink beverages, it is imperative that the absorption of flavor and aroma constituents in the polyethylene be significantly reduced in order to reduce flavor loss, minimize off-flavor development and extend the shelf life of the beverage.

In the art of clouding fluids, especially in an attempt to achieve the desired opacity cloud inherent in natural juices, it is known and standard practice to form oil-in-water or fat-in-water emulsions using edible oils or fats in the beverages. These emulsions contain various oils, all of which contribute to the cloud as well as emulsion stabilization agents. Emulsified coconut oil and dearomatized cocoa butter are known to be used as acceptable clouding agents for citrus drinks. For example, U.S. Pat. Nos. 4,093,750 to Babayon; 4,349,577 to Tessler; and 4,279,940 to Wurzberg et al. among others, describe the use of emulsified coconut oil as a desirable clouding agent. Emulsified dearomized cocoa butter used as a clouding agent in beverages has been described in co-pending U.S. application Ser. No. 439,006, filed Nov. 4, 1982 by Eng et al., commonly assigned as the present application to General Foods Inc., Canada.

Significant improvements are achieved by the use of coconut oil and dearomatized cocoa butter as the clouding agents in citrus flavored ready-to-drink beverages contained in an aseptic flexible polyethylene container, especially a low density polyethylene container.

SUMMARY OF THE INVENTION

It has been discovered that if coconut oil or dearomatized cocoa butter is added in amounts to provide the desired opacity or cloud inherent in natural juices, to a citrus flavored ready-to-drink beverage contained in a polyethylene container, especially a low density polyethylene flexible container, significant improvements are achieved in reducing flavor loss, minimizing off-flavor development and extending the shelf life of the beverage. The clouding agents of coconut oil and dearomatized cocoa butter not only improves both the visual appearance of the beverage and the organoleptic quality but also reduce the migration of flavor and aroma constituents into the polyethylene package.

DESCRIPTION OF THE INVENTION

The citrus flavored ready-to-drink beverage used in this invention includes 100% natural citrus juice such as orange, lemon, grapefruit, tangerine and the like. Although a clouding agent is not normally necessary in the natural citrus juice, the addition of coconut oil or dearomatized cocoa butter will reduce losses of d-limonene and other constituents to the polyethylene container. More dramatic improvements are observed in the citrus flavored ready-to-drink beverages containing from 0 to about 40 weight percent natural citrus juices based on the standard Brix of various citrus juice especially from about 10 to about 35 weight percent natural citrus juices. The weight percentages are based on the standard Brix of pure juice. In addition to natural citrus juices, citrus oils such as orange, lemon, lime, tangerine and the like are present in amounts from about 30 to about 400 parts per million in the ready-to-drink beverage, preferably about 50 to about 300 parts per million and more preferably from about 150 to about 200 parts per million based on the ready-to-drink beverage.

The amount of citrus oil present will depend upon the type of citrus flavored ready-to-drink beverage contemplated. The following have been found to be preferred amounts based on total beverage:

| Citrus Oils | |
| --- | --- |
| orange | 150–200 parts per million |
| lemon | 30–80 parts per million |
| grapefruit | 100–150 parts per million |
| tangerine | 150–200 parts per million |

It appears that as the amount of natural juice decreases in the beverage, higher percentages of the available flavor and aroma constituents migrate into the polyethylene container.

The clouding agents of coconut oil and dearomatized cocoa butter which are used in this invention can be present in the form of an emulsion solution, in combination with a dispersion of gum arabic in water or a spray-dried combination of clouding agent and gum arabic. The clouding agents are present in amounts from about 50 to about 100 parts per million, preferably about 300 to about 600 parts per million of the total beverage.

A combination of proper homogenization pressure and gum arabic to clouding agent ratios is an important factor in achieving cloud stability in a ready-to-drink beverage. Coconut oil and dearomatized cocoa butter require high homogenization pressures and high gum to fat ratios for maximum physical stability. The homogenization pressures will vary between 3,000 to 7,000 psig, preferably from 4,000 to 6,000 psig. With a Manton Gaulin lab scale homogenizer, the conditions for best physical stability for the coconut oil and cocoa butter clouds were a ratio of 4:1 gum arabic to clouding agent and a homogenization pressure of 5,000 psig, recycled for five passes through the homogenizer.

Generally, the resulting liquid emulsion contains from 10% to 30%, by weight, of gum arabic and a gum arabic: clouding agent ratio from 5:1 to 3:1, by weight, with a water content of 70% to 90%, by weight, based on the weight of the emulsion. Preferably, the resulting emulsion contains 20% to 25%, by weight, of gum arabic and gum arabic to clouding agent of 4.5:1 to 3.5:1, by weight, and a water content of 75% to 80%, by weight, based on the weight of the emulsion.

It is essential that the liquid emulsion cloud-forming agent added to the beverage is compatible with the other ingredients of the beverage. These ingredients include flavorants (e.g., flavor extracts or essences in alcohol, glycerol or propylene glycol, essential flavor oil emulsions, citrus juice concentrates and the like); weighting oils (e.g., ester gum and brominated vegetable oils); sweeteners (e.g., dextrose, sucrose, maltose, fructose, aspartame, certain dipeptides, saccharin and the like); edible acids (e.g., citric, phosphoric, lactic, adipic, tartaric, fumaric, malic and the like); natural or artificial colorants; carbonation sources (e.g., carbon dioxide and sodium, potassium and ammonium (bi)carbonates); encapsulating materials (e.g., gum arabic, modified food starches, dextrins, cellulose esters and ethers, gelatin and the like); preservatives (e.g., sodium benzoate, methyl- or proply-p-hydroxybenzoate and the like) among other additives.

The type of polyethylene used as the container in this invention can be any polyethylene container but is generally the flexible low density polyethylene in which the citrus flavored ready-to-drink beverage is sealed in an aseptic package. The sealed polyethylene is surrounded by cardboard, hard paper, hard plastic and the like. The types of containers included herein are those sold by Tetra Paks ®, Tetra Briks ®, Combi Bloc ®, IP container (International Paper) and the like.

The following examples will more fully illustrate the invention without limiting the same.

EXAMPLE 1

A coconut oil cloud was prepared by mixing together water, hydrogenated coconut oil, tricalcium and gum arabic and homogenizing at 5,000 psi. The material was spray-dried to obtain a spray-dried cloud having the following ingredients:

|  | Wt % |
| --- | --- |
| Gum Arabic | 80 |
| Hydrogenated Coconut Oil | 20 |

The spray-dried cloud is added as a clouding agent to the citrus flavored ready-to-drink beverage in Examples 2-4 below.

EXAMPLES 2-4

An orange flavored ready-to-drink beverage containing 10 weight percent natural orange juice was prepared by blending the following ingredients:

|  | Wt. % of Total Beverage |
| --- | --- |
| Sucrose | 9.3 |
| Food Acid | 0.6 |
| 65° Brix Orange Juice Concentrate | 1.8 |
| Ascorbic acid | 0.45 |
| Potassium Citrate | 0.5 |
| Food Coloring | 0.001 |
| Orange Oil Emulsion | 2.5 |
| Coconut Oil Cloud (Example 1) | 500 ppm |
| Water | to 100% |

500 parts per million coconut oil (i.e., 0.25% of the spray-dried cloud of Example 1) based on the total beverage was added to above ready-to-drink beverage. The resulting beverage at pH 3.8 was placed and sealed in various packages of an International Paper package with a low density polyethylene liner which contains the beverage. A duplicate beverage was prepared which does not contain any clouding agent, placed and sealed in an International Paper package with a low density polyethylene liner which contains the beverage.

A dearomatized cocoa butter cloud emulsion was prepared according to the process of U.S. application Ser. No. 439,006, Eng et al. which was composed as of the following ingredients expressed as a percentage by weight based on the weight of the emulsion.

| Ingredient | Wt. % |
| --- | --- |
| Water | 76.00 |
| Potassium Sorbate (Preservative) | 0.10 |
| Citric Acid (Food Acid) | 0.15 |
| Gum Arabic | 19.00 |
| Cocoa Butter | 4.75 |
|  | 100.00 |

The cocoa butter cloud emulsion was incorporated into a citrus-flavored, ready-to-drink beverage which had a pH of 3.8 and a 10% juice content and which had the following compositional make-up expressed as a percentage by weight based upon the weight of the beverage.

| Beverage Ingredient | Wt. % |
| --- | --- |
| Sucrose | 9.3 |
| Food Grade Acids | 0.6 |
| 65° Brix Orange Concentrate | 1.8 |
| Food Grade Buffer | 0.5 |
| Food Color | 0.001 |
| Flavor Oil Emulsion | 0.1–0.2 |
| Cocoa Butter Cloud Emulsion | 0.4–1.7 |
| Water | to 100% |

Each of the containers containing the orange flavored ready-to-drink beverage described above were stored at 21° C. over a period of time and the initial components determined by gas chromatography analysis and after a designated period the components were again analyzed. Table I identifies these components in the initial beverage and after 2 and 8 weeks of storage comparing a control method with a clouding agent and beverage each containing coconut oil cloud or dearomatized cocoa butter.

TABLE I

EFFECT OF CLOUDING AGENTS ON FLAVOUR VOLATILES RETENTION IN INTERNATIONAL PAPER PACKAGE, 10% JUICE pH 3.8, 500 PARTS PER MILLION (OIL)

| Component | Source | CONTROL | | | DEAROMATIZED COCOA BUTTER | | | COCONUT OIL | | |
|---|---|---|---|---|---|---|---|---|---|---|
| | | 0 | 2 wks | 8 wks | 0 | 2 wks | 8 wks | 0 | 2 wks | 8 wks |
| d-limonene | product | 229.5 | 156.0 | 64.0 | 224.0 | 129.2 | 141.2 | 230.0 | 140.0 | 131.9 |
| | package | — | 83.3 | 168.0 | — | 102.7 | 102.5 | — | 98.3 | 109.1 |
| α-pinene | product | 0.381 | 0.341 | 0.246 | 0.394 | 0.373 | 0.337 | 0.352 | 0.308 | 0.253 |
| Myrcene | product | 1.48 | 0.499 | 0.224 | 1.11 | 0.616 | 0.548 | 0.944 | 0.541 | 0.608 |
| Valencene | product | 0.430 | 0.216 | 0.033 | 0.435 | 0.138 | 0.053 | 0.399 | 0.168 | 0.043 |
| Octanal | product | 0.437 | 0.359 | 0.279 | 0.458 | 0.347 | 0.293 | 0.407 | 0.325 | 0.312 |
| Decanal | product | 2.03 | 0.687 | 0.531 | 1.43 | 0.731 | 0.612 | 1.24 | 0.679 | 0.732 |
| Nonanal | product | 0.402 | 0.253 | 0.224 | 0.361 | 0.254 | 0.249 | 0.315 | 0.233 | 0.250 |
| Dodecanal | product | 0.416 | 0.387 | 0.271 | 0.395 | 0.374 | 0.281 | 0.371 | 0.371 | 0.297 |
| α-terpineol | product | 0.893 | 1.07 | 1.40 | 0.876 | 0.940 | 1.15 | 0.832 | 0.937 | 1.37 |
| Linalool | product | 2.73 | 2.51 | 2.11 | 3.05 | 2.51 | 2.13 | 2.84 | 2.57 | 2.44 |

From Table I it should be noted that the amounts of d-limonene in the beverage after 8 weeks of storage are significantly higher in the beverage containing the dearomatized cocoa butter and coconut oil clouds. Most of the components after 8 weeks of storage are greater in the beverages containing the dearomatized cocoa butter and coconut oil clouds than those of the control. It was further observed that the formation of α-terpineol, an off-flavor component, was suppressed by the addition of dearomatized cocoa butter or coconut oil to the beverage.

What is claimed is:

1. In a citrus flavored ready-to-drink beverage contained in a polyethylene container, the improvement comprising the addition of a clouding agent selected from the group consisting of coconut oil and dearomatized cocoa butter to said citrus flavored ready-to-drink beverage reducing flavor loss, minimizing off-flavor development and extending shelf life of said beverage.

2. The process of claim 1 wherein the citrus flavored ready-to-drink beverage comprises citrus juice in amounts from 0 to about 40 weight percent of said beverage, citrus oils from about 30 to about 400 parts per million in said beverage and said clouding agent from about 50 to about 1,000 parts per million in said beverage.

3. The process of claim 1 wherein the citrus flavored ready-to-drink beverage comprises citrus juice in amounts from about 5 to about 35 weight percent of said beverage, citrus oils from about 50 to about 300 parts per million in said beverage, and said clouding agent from about 300 to 600 parts per million in said beverage.

4. The process of claim 3 wherein the citrus juice is orange juice in amounts from about 10 to about 30 weight percent of said beverage, citrus oil from about 150 to about 200 parts per million in said beverage and coconut oil from about 300 to about 600 parts per million in said beverage.

5. The process of claim 4 wherein dearomatized cocoa butter is substituted for coconut oil.

6. The process of claim 4 wherein the container is low density polyethylene.

7. The process of claim 4 wherein the citrus juice is lemon juice and citrus oil is present from about 30 to about 80 parts per million in said beverage.

8. The process of claim 4 wherein the citrus juice is lemon juice, citrus oil is present from about 30 to about 80 parts per million in said beverage and dearomatized cocoa butter is substituted for coconut oil.

9. The process of claim 4 wherein the citrus juice is grapefruit juice and citrus oil is present from about 100 to about 150 parts per million in said beverage.

10. The process of claim 4 wherein the citrus juice is grapefruit juice, citrus oil is present from about 100 to about 150 parts per million in said beverage and dearomatized cocoa butter is substituted for coconut oil.

11. The process of claim 4 wherein the citrus juice is tangerine juice and citrus oil is present from about 150 to about 200 parts per million in said beverage.

12. The process of claim 4 wherein the citrus juice is tangerine juice, citrus oil is present from about 150 to about 200 parts per million and dearomatized cocoa butter is substituted for coconut oil.

* * * * *